(12) United States Patent
Keulen et al.

(10) Patent No.: US 7,462,656 B2
(45) Date of Patent: Dec. 9, 2008

(54) ELECTRICALLY CONDUCTIVE COMPOSITIONS AND METHOD OF MANUFACTURE THEREOF

(75) Inventors: Jan Peter Keulen, Ossendrecht (NL); Christiaan Henricus Johannes Koevoets, Roosendaal (NL)

(73) Assignee: Sabic Innovative Plastics IP B.V. (NL)

( * ) Notice: Subject to any disclaimer, the term of this patent is extended or adjusted under 35 U.S.C. 154(b) by 636 days.

(21) Appl. No.: 11/057,946

(22) Filed: Feb. 15, 2005

(65) Prior Publication Data

US 2006/0183817 A1 Aug. 17, 2006

(51) Int. Cl.
C08J 3/20 (2006.01)
(52) U.S. Cl. ................ 523/351; 523/210; 524/439; 524/495; 524/496
(58) Field of Classification Search ............. 524/439, 524/440, 441, 495, 496; 523/210, 351
See application file for complete search history.

(56) References Cited

U.S. PATENT DOCUMENTS

| | | | |
|---|---|---|---|
| 2,465,319 A | 3/1949 | Whinfield et al. | |
| 3,047,539 A | 7/1962 | Pengilly | |
| 3,324,068 A | 6/1967 | Michaels | |
| 3,847,867 A | 11/1974 | Heath et al. | |
| 3,850,885 A | 11/1974 | Takekoshi et al. | |
| 3,852,113 A | 12/1974 | Yokota et al. | |
| 3,852,242 A | 12/1974 | White | |
| 3,855,178 A | 12/1974 | White et al. | |
| 3,972,902 A | 8/1976 | Heath et al. | |
| 3,983,093 A | 9/1976 | Williams, III et al. | |
| 4,005,053 A | 1/1977 | Briggs et al. | |
| 4,115,475 A | 9/1978 | Foy et al. | |
| 4,141,927 A | 2/1979 | White et al. | |
| 4,195,015 A | 3/1980 | Deleens et al. | |
| 4,230,838 A | 10/1980 | Foy et al. | |
| 4,331,786 A | 5/1982 | Foy et al. | |
| 4,332,920 A | 6/1982 | Foy et al. | |
| 4,443,591 A | 4/1984 | Schmidt et al. | |
| 4,455,410 A | 6/1984 | Giles, Jr. et al. | |
| 4,492,382 A | 1/1985 | Hounsel | |
| 4,536,531 A | 8/1985 | Ogawa et al. | |
| 4,559,164 A | 12/1985 | Kostelnik et al. | |
| 4,565,684 A | 1/1986 | Tibbetts et al. | |
| 4,572,813 A | 2/1986 | Arakawa | |
| 4,637,945 A | 1/1987 | Masui et al. | |
| 4,663,230 A | 5/1987 | Tennent | |
| 4,680,329 A | 7/1987 | Brown et al. | |
| 4,749,451 A | 6/1988 | Naarmann | |
| 4,816,289 A | 3/1989 | Komatsu et al. | |
| 4,839,441 A | 6/1989 | Cuzin et al. | |
| 4,864,014 A | 9/1989 | Cuzin et al. | |
| 4,871,613 A | 10/1989 | Akao | |
| 4,876,033 A | 10/1989 | Dziurla et al. | |
| 4,876,078 A | 10/1989 | Arakawa et al. | |
| 4,908,418 A | 3/1990 | Holub | |
| 4,908,419 A | 3/1990 | Holub et al. | |
| 4,966,729 A | 10/1990 | Carmona et al. | |
| 4,968,418 A | 11/1990 | Rohr | |
| 5,004,561 A | 4/1991 | Nomura et al. | |
| 5,024,818 A | 6/1991 | Tibbetts et al. | |
| 5,036,580 A | 8/1991 | Fox et al. | |
| 5,071,329 A | 12/1991 | Sano et al. | |
| 5,093,435 A | 3/1992 | Harris et al. | |
| 5,132,365 A * | 7/1992 | Gallucci ............... 525/92 B |
| 5,159,053 A | 10/1992 | Kolycheck et al. | |
| 5,165,909 A | 11/1992 | Tennent et al. | |
| 5,171,761 A | 12/1992 | Penco et al. | |
| 5,227,038 A | 7/1993 | Smalley et al. | |
| 5,256,335 A | 10/1993 | Byrd et al. | |
| 5,284,903 A | 2/1994 | Minnick | |
| 5,300,203 A | 4/1994 | Smalley | |
| 5,300,553 A | 4/1994 | Yamanashi et al. | |

(Continued)

FOREIGN PATENT DOCUMENTS

| | | |
|---|---|---|
| EP | 0 198 558 B1 | 4/1993 |
| EP | 0 822 224 A2 | 2/1998 |
| EP | 0 365 168 B1 | 5/1999 |
| EP | 1 073 090 A2 | 1/2001 |
| EP | 0 854 839 B1 | 4/2002 |
| EP | 1 209 123 A2 | 5/2002 |
| EP | 1 336 673 A1 | 8/2003 |
| EP | 1 359 169 A2 | 11/2003 |
| EP | 1 369 452 A1 | 12/2003 |
| EP | 1 052 654 B1 | 1/2004 |

(Continued)

OTHER PUBLICATIONS

Japanese Abstract for JP 2002077442 A Publication date Mar. 16, 1990.
Japanese Abstract for JP 2002273741 A Publication date Sep. 25, 2002.
Japanese Abstract for JP 2002365427 A2 Publication date Dec. 18, 2002.

(Continued)

Primary Examiner—Edward J Cain
(74) Attorney, Agent, or Firm—Cantor Colburn LLP (57) ABSTRACT

Disclosed herein is a method of manufacturing an electrically conductive composition comprising reducing the viscosity of a molten masterbatch to form a reduced viscosity molten masterbatch; and mixing the reduced viscosity molten masterbatch with a polymer to form the electrically conductive composition. Disclosed herein too is a method of manufacturing an electrically conductive composition comprising mixing a molten masterbatch with a first polymer in a first extruder, wherein the first polymer has a melt viscosity that is lower than the melt viscosity of the molten masterbatch; reducing the melt viscosity of the molten masterbatch to form a reduced viscosity molten masterbatch; and mixing the reduced viscosity molten masterbatch with a second polymer in a second extruder to form the electrically conductive composition.

21 Claims, 2 Drawing Sheets

U.S. PATENT DOCUMENTS

| | | |
|---|---|---|
| 5,302,274 A | 4/1994 | Tomantschger et al. |
| 5,312,866 A | 5/1994 | Tsutsumi et al. |
| 5,354,607 A | 10/1994 | Swift et al. |
| 5,385,970 A | 1/1995 | Gallucci et al. |
| 5,439,987 A | 8/1995 | Scott et al. |
| 5,445,327 A | 8/1995 | Creehan |
| 5,484,837 A | 1/1996 | Kung et al. |
| 5,514,748 A | 5/1996 | Isutsumi et al. |
| 5,516,837 A | 5/1996 | Tsutsumi et al. |
| 5,543,474 A | 8/1996 | Kawaki et al. |
| 5,556,517 A | 9/1996 | Smalley |
| 5,566,892 A | 10/1996 | Creehan |
| 5,571,875 A | 11/1996 | Tsutsumi et al. |
| 5,589,152 A | 12/1996 | Tennent et al. |
| 5,591,312 A | 1/1997 | Smalley |
| 5,591,382 A | 1/1997 | Nahass et al. |
| 5,591,832 A | 1/1997 | Koshijima et al. |
| 5,604,284 A | 2/1997 | Ueda et al. |
| 5,641,455 A | 6/1997 | Rosenlund et al. |
| 5,643,502 A | 7/1997 | Nahass et al. |
| 5,643,990 A | 7/1997 | Uehara et al. |
| 5,651,922 A * | 7/1997 | Nahass et al. ............... 252/511 |
| 5,652,326 A | 7/1997 | Ueda et al. |
| 5,654,357 A | 8/1997 | Menashi et al. |
| 5,718,995 A | 2/1998 | Eichorst et al. |
| 5,744,235 A | 4/1998 | Creehan |
| 5,830,326 A | 11/1998 | Iijima |
| 5,840,807 A | 11/1998 | Frey et al. |
| 5,863,466 A | 1/1999 | Mor |
| 5,866,647 A | 2/1999 | Massey et al. |
| 5,872,177 A | 2/1999 | Whitehouse |
| 5,876,647 A | 3/1999 | Makise et al. |
| 5,886,098 A | 3/1999 | Ueda et al. |
| 5,919,429 A | 7/1999 | Tanaka et al. |
| 6,063,874 A | 5/2000 | Jin et al. |
| 6,103,413 A | 8/2000 | Hinton et al. |
| 6,107,415 A | 8/2000 | Silvi et al. |
| 6,111,031 A | 8/2000 | Puyenbroek et al. |
| 6,148,280 A | 11/2000 | Kramer |
| 6,149,840 A | 11/2000 | Ardakani et al. |
| 6,149,848 A | 11/2000 | Makise et al. |
| 6,150,473 A | 11/2000 | Brown et al. |
| 6,156,256 A | 12/2000 | Kennel |
| 6,183,714 B1 | 2/2001 | Smalley et al. |
| 6,187,823 B1 | 2/2001 | Haddon et al. |
| 6,248,262 B1 | 6/2001 | Kubotera et al. |
| 6,252,011 B1 | 6/2001 | Scott |
| 6,265,466 B1 | 7/2001 | Glatkowski et al. |
| 6,277,952 B1 | 8/2001 | Dhawan et al. |
| 6,284,832 B1 | 9/2001 | Foulger et al. |
| 6,299,812 B1 | 10/2001 | Newman et al. |
| 6,331,265 B1 | 12/2001 | Dupire et al. |
| 6,344,513 B1 | 2/2002 | Numata |
| 6,346,189 B1 | 2/2002 | Dai et al. |
| 6,365,069 B2 | 4/2002 | Butler et al. |
| 6,368,569 B1 | 4/2002 | Haddon et al. |
| 6,372,376 B1 | 4/2002 | Fronk et al. |
| 6,376,057 B1 | 4/2002 | Akao et al. |
| 6,379,795 B1 | 4/2002 | Bisaria et al. |
| 6,384,128 B1 | 5/2002 | Wadahara et al. |
| 6,388,046 B1 | 5/2002 | Campbell et al. |
| 6,407,922 B1 | 6/2002 | Eckblad et al. |
| 6,426,134 B1 | 7/2002 | Lavin et al. |
| 6,517,995 B1 | 2/2003 | Jacobson et al. |
| 6,528,572 B1 | 3/2003 | Patel et al. |
| 6,540,945 B2 | 4/2003 | Kubotera et al. |
| 6,544,463 B1 | 4/2003 | Luzzi et al. |
| 6,555,945 B1 | 4/2003 | Baughman et al. |
| 6,565,784 B1 | 5/2003 | Esseghir et al. |
| 6,576,341 B1 | 6/2003 | Davey et al. |
| 6,599,446 B1 | 7/2003 | Todt et al. |
| 6,608,133 B2 | 8/2003 | Kurasawa et al. |
| 6,630,772 B1 | 10/2003 | Bower et al. |
| 6,634,321 B2 | 10/2003 | Hussain et al. |
| 6,643,165 B2 | 11/2003 | Segal et al. |
| 6,673,864 B2 | 1/2004 | Patel et al. |
| 6,689,835 B2 | 2/2004 | Amarasekera et al. |
| 6,734,262 B2 | 5/2004 | Patel |
| 6,761,870 B1 | 7/2004 | Smalley et al. |
| 6,790,425 B1 | 9/2004 | Smalley et al. |
| 6,811,724 B2 | 11/2004 | Majumdar et al. |
| 6,936,233 B2 | 8/2005 | Smalley et al. |
| 2001/0010809 A1 | 8/2001 | Haddon et al. |
| 2001/0016608 A1 | 8/2001 | Haddon et al. |
| 2001/0023937 A1 | 9/2001 | Patel |
| 2001/0031900 A1 | 10/2001 | Margrave et al. |
| 2001/0041160 A1 | 11/2001 | Margrave et al. |
| 2002/0004028 A1 | 1/2002 | Margrave et al. |
| 2002/0031465 A1 | 3/2002 | Saito |
| 2002/0035170 A1 | 3/2002 | Glatkowski et al. |
| 2002/0039675 A1 | 4/2002 | Braun et al. |
| 2002/0046872 A1 | 4/2002 | Smalley et al. |
| 2002/0048632 A1 | 4/2002 | Smalley et al. |
| 2002/0053257 A1 | 5/2002 | Brice et al. |
| 2002/0068170 A1 | 6/2002 | Smalley et al. |
| 2002/0084410 A1 | 7/2002 | Colbert et al. |
| 2002/0085968 A1 | 7/2002 | Smalley et al. |
| 2002/0086124 A1 | 7/2002 | Margrave et al. |
| 2002/0088938 A1 | 7/2002 | Colbert et al. |
| 2002/0090331 A1 | 7/2002 | Smalley et al. |
| 2002/0091619 A1 | 7/2002 | Yang |
| 2002/0092613 A1 | 7/2002 | Kuper |
| 2002/0092983 A1 | 7/2002 | Colbert et al. |
| 2002/0092984 A1 | 7/2002 | Colbert et al. |
| 2002/0094311 A1 | 7/2002 | Smalley et al. |
| 2002/0096634 A1 | 7/2002 | Colbert et al. |
| 2002/0098135 A1 | 7/2002 | Smalley et al. |
| 2002/0099128 A1 | 7/2002 | Patel et al. |
| 2002/0102193 A1 | 8/2002 | Smalley et al. |
| 2002/0102194 A1 | 8/2002 | Smalley et al. |
| 2002/0102196 A1 | 8/2002 | Smalley et al. |
| 2002/0102201 A1 | 8/2002 | Colbert et al. |
| 2002/0102203 A1 | 8/2002 | Smalley et al. |
| 2002/0109086 A1 | 8/2002 | Colbert et al. |
| 2002/0109087 A1 | 8/2002 | Colbert et al. |
| 2002/0110513 A1 | 8/2002 | Margrave et al. |
| 2002/0127162 A1 | 9/2002 | Smalley et al. |
| 2002/0127169 A1 | 9/2002 | Smalley et al. |
| 2002/0136681 A1 | 9/2002 | Smalley et al. |
| 2002/0136683 A1 | 9/2002 | Smalley et al. |
| 2002/0150524 A1 | 10/2002 | Smalley et al. |
| 2002/0155333 A1 | 10/2002 | Fitts et al. |
| 2002/0159943 A1 | 10/2002 | Smalley et al. |
| 2002/0159944 A1 | 10/2002 | Smalley et al. |
| 2002/0161101 A1 | 10/2002 | Carroll et al. |
| 2002/0172789 A1 | 11/2002 | Watson et al. |
| 2002/0176650 A1 | 11/2002 | Zhao et al. |
| 2002/0179564 A1 | 12/2002 | Geobegan et al. |
| 2002/0180077 A1 | 12/2002 | Glatkowski et al. |
| 2002/0185770 A1 | 12/2002 | McKague |
| 2003/0001141 A1 | 1/2003 | Sun et al. |
| 2003/0004058 A1 | 1/2003 | Li et al. |
| 2003/0008123 A1 | 1/2003 | Glatkowski et al. |
| 2003/0010910 A1 | 1/2003 | Colbert et al. |
| 2003/0012722 A1 | 1/2003 | Liu |
| 2003/0026754 A1 | 2/2003 | Clarke et al. |
| 2003/0044608 A1 | 3/2003 | Yoshizawa et al. |
| 2003/0053801 A1 | 3/2003 | Cornell |
| 2003/0066960 A1 | 4/2003 | Colbert et al. |
| 2003/0075682 A1 | 4/2003 | Colbert et al. |
| 2003/0083421 A1 | 5/2003 | Kumar et al. |
| 2003/0089890 A1 | 5/2003 | Niu et al. |
| 2003/0089893 A1 | 5/2003 | Niu et al. |
| 2003/0092824 A1 | 5/2003 | Bastiaens et al. |

| | | | |
|---|---|---|---|
| 2003/0100653 A1 | 5/2003 | Chacko | |
| 2003/0106998 A1 | 6/2003 | Colbert et al. | |
| 2003/0108477 A1 | 6/2003 | Keller et al. | |
| 2003/0111333 A1 | 6/2003 | Montgomery et al. | |
| 2003/0122111 A1 | 7/2003 | Glatkowski et al. | |
| 2003/0124717 A1 | 7/2003 | Awano et al. | |
| 2003/0132376 A1 | 7/2003 | Bonnell et al. | |
| 2003/0133865 A1 | 7/2003 | Smalley et al. | |
| 2003/0143350 A1 | 7/2003 | Jimenez | |
| 2003/0151030 A1 | 8/2003 | Gurin | |
| 2003/0153965 A1 | 8/2003 | Supronowicz et al. | |
| 2003/0164427 A1 | 9/2003 | Glatkowski et al. | |
| 2003/0165658 A1 | 9/2003 | Hayakawa et al. | |
| 2003/0168756 A1 | 9/2003 | Balkus, Jr. et al. | |
| 2003/0170166 A1 | 9/2003 | Smalley et al. | |
| 2003/0171457 A1 | 9/2003 | Matuana et al. | |
| 2003/0180526 A1 | 9/2003 | Winey et al. | |
| 2003/0181568 A1 | 9/2003 | Amarasekera et al. | |
| 2003/0213939 A1 | 11/2003 | Narayan et al. | |
| 2003/0216502 A1 | 11/2003 | McElrath et al. | |
| 2004/0009346 A1 | 1/2004 | Jang et al. | |
| 2004/0021133 A1 | 2/2004 | Nagpal et al. | |
| 2004/0028859 A1 | 2/2004 | LeGrande et al. | |
| 2004/0106998 A1 | 6/2004 | Ferree | |
| 2004/0186220 A1 | 9/2004 | Smalley et al. | |
| 2004/0211942 A1 | 10/2004 | Clark et al. | |
| 2004/0232389 A1 | 11/2004 | Elkovitch | |
| 2004/0238793 A1 | 12/2004 | Hossan et al. | |
| 2004/0262581 A1 | 12/2004 | Rodrigues | |
| 2005/0029498 A1 | 2/2005 | Elkovitch | |
| 2005/0070657 A1 | 3/2005 | Elkovitch et al. | |

FOREIGN PATENT DOCUMENTS

| | | |
|---|---|---|
| EP | 1 428 793 A1 | 6/2004 |
| EP | 1 460 703 A1 | 9/2004 |
| WO | WO 97/09272 | 3/1997 |
| WO | WO 97/15935 | 5/1997 |
| WO | WO 97/32646 | 9/1997 |
| WO | WO 98/05920 | 2/1998 |
| WO | WO 98/39250 | 9/1998 |
| WO | WO 00/17101 | 3/2000 |
| WO | WO 00/17102 | 3/2000 |
| WO | WO 00/26138 | 5/2000 |
| WO | WO 00/52710 | 9/2000 |
| WO | WO 01/17101 A1 | 3/2001 |
| WO | WO 01/30694 A1 | 5/2001 |
| WO | WO 01/38219 A1 | 5/2001 |
| WO | WO 01/49599 A2 | 7/2001 |
| WO | WO 01/57284 A1 | 8/2001 |
| WO | WO 01/75902 A1 | 10/2001 |
| WO | WO 01/89013 A2 | 11/2001 |
| WO | WO 01/92381 A1 | 12/2001 |
| WO | WO 01/95344 A1 | 12/2001 |
| WO | WO 01/99146 A2 | 12/2001 |
| WO | WO 02/16257 A2 | 2/2002 |
| WO | WO 02/20402 A1 | 3/2002 |
| WO | WO 02/39051 A2 | 5/2002 |
| WO | WO 02/42204 A2 | 5/2002 |
| WO | WO 02/44566 A1 | 6/2002 |
| WO | WO 02/055769 A1 | 7/2002 |
| WO | WO 02/060812 A2 | 8/2002 |
| WO | WO 02/060813 A2 | 8/2002 |
| WO | WO 02/064868 A1 | 8/2002 |
| WO | WO 02/064869 A1 | 8/2002 |
| WO | WO 02/068170 A1 | 9/2002 |
| WO | WO 02/076430 A1 | 10/2002 |
| WO | WO 02/076724 A1 | 10/2002 |
| WO | WO 02/076888 A1 | 10/2002 |
| WO | WO 02/076903 A2 | 10/2002 |
| WO | WO 02/079082 A2 | 10/2002 |
| WO | WO 02/080195 A1 | 10/2002 |
| WO | WO 02/081372 A2 | 10/2002 |
| WO | WO 02/088025 A1 | 11/2002 |
| WO | WO 02/090330 A1 | 11/2002 |
| WO | WO 02/095097 A1 | 11/2002 |
| WO | WO 02/100154 A2 | 12/2002 |
| WO | WO 02/100775 A2 | 12/2002 |
| WO | WO 02/100931 A1 | 12/2002 |
| WO | WO 03/004741 A1 | 1/2003 |
| WO | WO 03/005450 A2 | 1/2003 |
| WO | WO 03/007314 A1 | 1/2003 |
| WO | WO 03/011755 A1 | 2/2003 |
| WO | WO 03/012722 A1 | 2/2003 |
| WO | WO 03/013199 A2 | 2/2003 |
| WO | WO 03/020638 A1 | 3/2003 |
| WO | WO 03/024798 A1 | 3/2003 |
| WO | WO 03/040026 A2 | 5/2003 |
| WO | WO 03/049219 A1 | 6/2003 |
| WO | WO 03/070821 A2 | 8/2003 |
| WO | WO 03/072679 A1 | 9/2003 |
| WO | WO 03/076703 A1 | 9/2003 |
| WO | WO 03/078315 A2 | 9/2003 |
| WO | WO 03/078317 A1 | 9/2003 |
| WO | WO 03/080513 A2 | 10/2003 |
| WO | WO 03/085049 A1 | 10/2003 |
| WO | WO 03/085681 A1 | 10/2003 |
| WO | WO 03/092763 A1 | 11/2003 |
| WO | WO 2004/001107 A2 | 12/2003 |
| WO | WO 2004/059663 A1 | 7/2004 |
| WO | WO 2004/097852 A1 | 11/2004 |

OTHER PUBLICATIONS

Japanese Abstract for JP 2003096313 A Publication date Apr. 3, 2003.

Japanese Abstract for JP 2001011344 A Publication date Jan. 16, 2001.

Japanese Abstract for JP 2002313147 A Publication date Oct. 25, 2002.

Japanese Abstract for JP 2003146632 A Publication date May 21, 2003.

Japanese Abstract for JP2002365427 XP-002331312 WPI/Derwent, Dec. 18, 2002.

Harry. J. Barraza "SWNT-Filled Thermoplastic and Elastomeric Composites Prepared by Miniemulsion Polymerization" NANO Letters, vol. 2, No. 8, Aug. 2002, pp. 797-802.

Cheol Park et al. "Dispersion of single wall carbon nanotubes by in situ polymerization under sonication" Chemical Physics Letters Elsevier Netherlands, vol. 364, No. 3-4, Oct. 4, 2002, pp. 303-308, XP002331311.

A. Dufresne et al. "Processing and Characterization of Carbon Nanotube/Poly(styrene0co-butyl acrylate) nanocomposites" Journal Of Materials Schence 37 p. 3915-3923 (2002).

"Conductive Plastics for Medical Applications" *Medical Device and Diagnostic Industry Magazine*, Jan. 1999 http://www.devicelink.com/mddi/archive/99/01/009.html.

Bernie Miller "Tiny Graphite 'tubes' Create High-Efficiency Conductive Plastics" *Conductive Plastics*, Plastics World Magazine article http://www.fibrils.com/conplas1.htm Jan. 18, 2001.

Hyperion Catalysis International "Unique Slough Resistant SR™ Series ESD Thermoplastic Product Line Offers Reduced Particle Contamination for Demanding Electronic Applications" http://www.fibrils.com/esd.htm Jan. 18, 2001.

M.S.P. Shaffer et al. "Dispersion of Carbon Nanotubes: Polymeric Analogies" Proc. Polymer 1999, Department of Materials Science, Cambridge University. pp. 24-27.

Collins et al. "Controlling the Electronic Properties of Carbon Nanotube Bundles" Abstract only IBM Research Division, T.J. Watson Research Center, Yorktown Heights, NY 10598, USA, http://www.nanotube.org/abstracts/collinsp.html, 2001.

Tesner et al. "Formation of Carbon Fibers from Acetylene" Carbon, 1970, vol. 8, pp. 435-442, Pergamon Pres. Great Britain.

Cotton and Wilkinson, *Advanced Inorganic Chemistry*, Publisher: John Wiley & Sons 6th edition, Publication date Mar. 1999, p. 76.

J.G. Smith Jr., et al. "Carbon Nanotube/Space Durable Polymer Nanocomposite Films for Electrostatic Charge Dissipation" NASA Langley Research Center; 34th International SAMPE Technical Conference, Baltimore, Maryland, Nov. 4-7, 2002.

International Search Report PCT/US 2004/020082 International Filing Date Jun. 22, 2004.

International Search Report PCT/US 2004/012146 International Filing Date Apr. 20, 2004.

International Search Report PCT/US 2004/012109 International Filing Date Apr. 20, 2004.

International Search Report PCT/US 2004/026136 International Filing Date Aug. 12, 2004.

International Search Report PCT/US 2004/025651 International Filing Date Aug. 6, 2004.

International Search Report PCT/US 2004/030864 International Filing Date Sep. 21, 2004.

International Search Report PCT/US 2004/031061 International Filing Date Sep. 22, 2004.

U.S. Appl. No. 10/675,108, filed Sep. 30, 2003, Ghosh et al., Electrically Conductive Compositions, Methods of Manufacture Thereof and Articles Derived From Such Compositions.

U.S. Appl. No. 10/803,694, filed Mar. 18, 2004, Charati et al., Electrically Conductive Compositions and Method of Manufacture Thereof.

U.S. Appl. No. 10/608,976, filed Jun. 27, 2003, Rodrigues, Electrically Conductive Compositions and Method of Manufacture Thereof.

U.S. Appl. No. 09/787,473, filed Mar. 16, 2001, Jonh Margrave Chemical Derivatization of Single-Wall Carbon Nanotubes to Facilitate Solvation Thereof, and Use of Derivatized Nanotubes.

U.S. Appl. No. 10/674,096, filed Sep. 29, 2003, Mark Elkovitch, Conductive Thermoplastic Compositions, Methods of Manufacture and Articles Derived From Such Compositions.

Applied Nanotech Inc. webpage (http://www.applied-nanotech.com/cntproperties.htm).

International Search Report; International App. No. PCT/US2006/004468; Applicant's No. 08CN8788 (GP2-0388) Date of Mailing Nov. 20, 2006.

* cited by examiner

ELECTRICALLY CONDUCTIVE COMPOSITIONS AND METHOD OF MANUFACTURE THEREOF

BACKGROUND

This disclosure relates to electrically conductive compositions and methods of manufacture thereof.

Articles made from polymers are commonly utilized in material-handling and electronic devices such as packaging film, chip carriers, computers, printers and photocopier components where electrostatic dissipation or electromagnetic shielding are important requirements. Electrostatic dissipation (hereinafter ESD) is defined as the transfer of electrostatic charge between bodies at different potentials by direct contact or by an induced electrostatic field. Electromagnetic shielding (hereinafter EM shielding) effectiveness is defined as the ratio (in decibels) of the proportion of an electromagnetic field incident upon the shield that is transmitted through it. As electronic devices become smaller and faster, their sensitivity to electrostatic charges is increased and hence it is generally desirable to utilize polymers that have been modified to provide improved electrostatically dissipative properties. In a similar manner, it is desirable to modify polymers so that they can provide improved electromagnetic shielding while simultaneously retaining some or all of the advantageous mechanical properties of the polymers.

Conductive fillers such as graphite fibers derived from pitch and polyacrylonitrile having diameters larger than 2 micrometers are often incorporated into polymers to improve the electrical properties and achieve ESD and EM shielding. However, because of the large size of these graphite fibers, the incorporation of such fibers generally causes a decrease in the mechanical properties such as impact. In addition, incomplete dispersion of the carbon fibers promotes inhomogeneity within articles derived from the composition. There accordingly remains a need in the art for conductive polymeric compositions, which while providing adequate ESD and EM shielding, can retain their mechanical properties. There also remains a need for methods wherein the electrically conductive fillers can be dispersed in such a manner so as to minimize inhomogeneity in article derived from the composition.

SUMMARY

Disclosed herein is a method of manufacturing an electrically conductive composition comprising reducing the viscosity of a molten masterbatch to form a reduced viscosity molten masterbatch; and mixing the reduced viscosity molten masterbatch with a polymer to form the electrically conductive composition.

Disclosed herein too is a method of manufacturing an electrically conductive composition comprising mixing a molten masterbatch with a first polymer in a first extruder, wherein the first polymer has a melt viscosity that is lower than the melt viscosity of the molten masterbatch; reducing the melt viscosity of the molten masterbatch to form a reduced viscosity molten masterbatch; and mixing the reduced viscosity molten masterbatch with a second polymer in a second extruder to form the electrically conductive composition.

Disclosed herein too is a method of manufacturing an electrically conductive composition comprising mixing a molten masterbatch with a polyamide in a first extruder, wherein the polyamide has a melt viscosity that is lower than the melt viscosity of the molten masterbatch; reducing the melt viscosity of the molten masterbatch to form a reduced viscosity molten masterbatch; and mixing the reduced viscosity molten masterbatch with a polyarylene ether in a second extruder to form the electrically conductive composition.

Disclosed herein too is a method of manufacturing a composition comprising melting a masterbatch to form a molten masterbatch in a first extruder; and mixing the molten masterbatch with a polymer in a second extruder to form the composition.

DETAILED DESCRIPTION

Disclosed herein are methods for manufacturing electrically conductive compositions comprising polymers and electrically conductive fillers, such that the electrically conductive compositions have a bulk volume resistivity of less than or equal to about $10e^8$ ohm-cm, while displaying impact properties greater than or equal to about 10 kilojoules/square meter and a Class A surface finish. The method advantageously involves melt blending a molten masterbatch with a molten polymer to improve distribution of electrically conductive filler in the electrically conductive composition. In one embodiment, the method advantageously involves reducing the viscosity of a molten masterbatch prior to mixing with a molten polymer to form the electrically conductive composition. The masterbatch comprises electrically conductive filler. The reduction in viscosity of the molten masterbatch takes place in a first extruder, which acts as a side compounder for a second extruder. The reduction in viscosity can be brought about by adding to the masterbatch a diluent, a plasticizer, or a polymer having a lower melt viscosity than the melt viscosity of the masterbatch.

The method can also advantageously be used to facilitate the dispersion of additives and fillers, other than electrically conductive fillers in a composition. Thus, in one embodiment, a molten masterbatch containing additives and/or fillers that are not electrically conductive can be melt blended with a molten polymer to obtain a composition. In another embodiment, the method advantageously involves reducing the viscosity of a molten masterbatch prior to mixing with a molten polymer to form a composition that comprise non-electrically conductive fillers and/or additives. In yet another embodiment, the composition can comprise a mixture of non-conductive additives and fillers as well as electrically conductive fillers.

In one embodiment, a masterbatch is first melt blended in the first extruder. The molten masterbatch is then mixed with a second polymer in a second extruder to form the electrically conductive composition. The electrically conductive composition is then extruded from the second extruder. As noted above, the composition is electrically conductive only when the filler is electrically conductive.

In one embodiment, a first polymer and the molten masterbatch are mixed in the first extruder to form a reduced viscosity molten masterbatch. The reduced viscosity molten masterbatch is then mixed with a second polymer in a second extruder to form the electrically conductive composition. The electrically conductive composition is then extruded from the second extruder.

Figure 1:
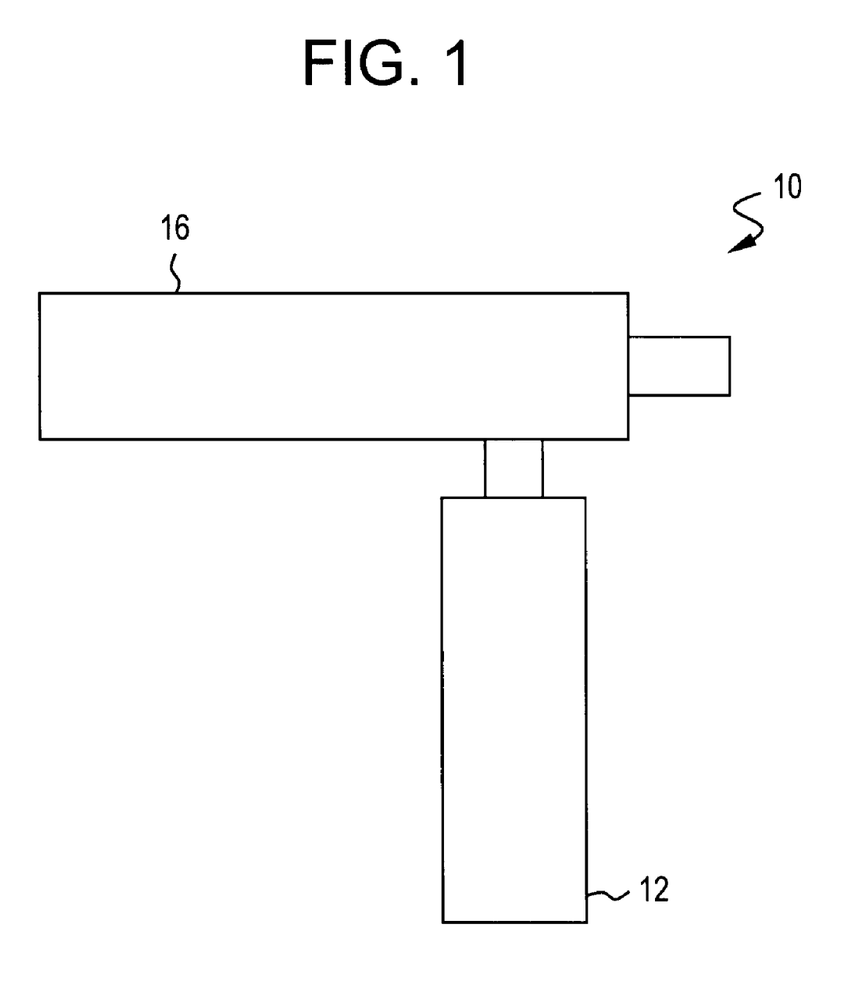
FIG. 1 is a depiction of an exemplary embodiment of the extrusion system 10 reflecting a first extruder 12 and a second extruder 16. The output from the first extruder 12 is fed into the second extruder 16.

With reference now to the FIG. 1, an exemplary extrusion system 10 reflects first extruder 12 and a second extruder 16. The first extruder 12 also referred to as a side compounder feeds a molten mixture of the masterbatch and a first polymer into the second extruder 16 that serves as the main extruder. The first polymer has a melt viscosity that is lower than the melt viscosity of the masterbatch. The mixing of the first polymer with the masterbatch reduces the melt viscosity of the masterbatch. The molten mixture of the masterbatch and the first polymer is termed the reduced viscosity molten masterbatch. Reducing the viscosity of the molten masterbatch in the first extruder prior to mixing with the second polymer in the second extruder facilitates better mixing.

The second extruder 16 also contains the second polymer in the molten state. The reduced viscosity molten masterbatch is mixed with the second polymer in the second extruder 16 to form the electrically conductive composition. In one embodiment, it is desirable for the viscosity of the molten masterbatch to be equal to the viscosity of the molten second polymer at the point of contact of the two melts. Without being limited by theory, it is believed that when the melt viscosity of the reduced viscosity molten masterbatch equals the melt viscosity of the second polymer, optimal mixing of the polymers can be achieved. This optimal mixing permits a better dispersion of the electrically conductive filler.

This method can be utilized to manufacture electrically conductive compositions having a surface resistivity greater than or equal to about $10^8$ ohm/square (ohm/sq) while having a bulk volume resistivity of less than or equal to about $10e^8$ ohm-cm, while displaying impact properties greater than or equal to about 10 kilojoules/square meter and a Class A surface finish. In another embodiment, the method can be used to manufacture electrically conductive compositions having uniform electrical conductivity in mutually perpendicular directions, thus minimizing any inhomogeneity in the electrical conductivity across the bulk of the electrically conductive composition.

Such electrically conductive compositions can be advantageously utilized in computers, electronic goods, semi-conductor components, circuit boards, or the like which need to be protected from electrostatic dissipation. They may also be used advantageously in automotive body panels both for interior and exterior components of automobiles that can be electrostatically painted if desired.

The first polymer and the second polymer used in the electrically conductive compositions may be selected from a wide variety of thermoplastic resins, blends of thermoplastic resins, or blends of thermoplastic resins with thermosetting resins. The first and second polymers may also be a blend of polymers, copolymers, terpolymers, or combinations comprising at least one of the foregoing polymers. Specific, but non-limiting examples of thermoplastic polymers include polyacetals, polyacrylics, polyarylene ethers, polycarbonates, polystyrenes, polyesters, polyamides, polyamideimides, polyarylates, polyurethanes, polyarylsulfones, polyethersulfones, polyarylene sulfides, polyvinyl chlorides, polysulfones, polyetherimides, polytetrafluoroethylenes, polyetherketones, polyether etherketones, or the like, or a combination comprising at least one of the foregoing thermoplastic polymers.

Specific non-limiting examples of blends of thermoplastic polymers include acrylonitrile-butadiene-styrene/nylon, polycarbonate/acrylonitrile-butadiene-styrene, polyphenylene ether/polystyrene, polyphenylene ether/polyamide, polycarbonate/polyester, polyphenylene ether/polyolefin, and combinations comprising at least one of the foregoing blends of thermoplastic polymers.

In one embodiment, the first and second polymers are different from each other. In another embodiment, the first polymer is of the same composition as the second polymer. When the first polymer is of the same composition as the second polymer, the molecular weight and hence the melt viscosity of the first polymer can be greater than the molecular weight and the melt viscosity of the second polymer. In an exemplary embodiment, the first polymer is a polyarylene ether, while the second polymer is a polyamide. The polyarylene ether may be compatibilized with polyamide if desired.

Polyarylene ethers per se, are known polymers comprising a plurality of structural units of the formula (I):

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. In an exemplary embodiment, each $Q^1$ is alkyl or phenyl, especially $C_{1-4}$ alkyl, and each $Q^2$ is hydrogen.

Both homopolymer and copolymer polyarylene ethers are included. Exemplary homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are polyarylene ethers containing moieties prepared by grafting vinyl monomers or polymers such as polystyrenes; and coupled polyarylene ether in which coupling agents such as low molecular weight polycarbonates, quinones, heterocycles and formals that undergo reaction in a known manner with the hydroxy groups of two polyarylene ether chains to produce a higher molecular weight polymer.

The polyarylene ether generally has a number average molecular weight of about 3,000 to about 40,000 and a weight average molecular weight of about 20,000 to about 80,000, as determined by gel permeation chromatography (GPC). The polyarylene ether generally has an intrinsic viscosity of about 0.10 to about 0.60 deciliters per gram (dl/g) when measured in chloroform at 25° C. In another embodiment, the polyarylene ether generally has an intrinsic viscosity about 0.29 to about 0.48 dl/g, when measured in chloroform at 25° C. It is also possible to utilize a high intrinsic viscosity polyarylene ether and a low intrinsic viscosity polyarylene ether in combination as long as the combination has an intrinsic viscosity of about 0.10 to about 0.60 dl/g.

The polyarylene ethers are generally prepared by the oxidative coupling of at least one monohydroxyaromatic compound such as 2,6-xylenol or 2,3,6-trimethylphenol. Catalyst systems are generally employed for such coupling; they generally contain at least one heavy metal compound such as a copper, manganese or cobalt compound, usually in combination with various other materials.

Particularly useful polyarylene ethers for many purposes are those that comprise molecules having at least one aminoalkyl-containing end group. The aminoalkyl radical is located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, generally obtained from reaction mixtures in which a by-product diphenoquinone is present, especially in a copper-halide-secondary or tertiary amine system. A substantial proportion of the polymer molecules, generally constituting as much as about 90% by weight of the polymer, may contain at least one of said aminoalkyl-containing and 4-hydroxybiphenyl end groups.

Useful polyamides are a generic family known as nylons, characterized by the presence of an amide group (—C(O)NH—). Nylon-6 and nylon-6,6 are exemplary polyamides and are available from a variety of commercial sources. Other polyamides, however, such as nylon-4,6, nylon-12, nylon-6,10, nylon 6,9, nylon 6/6T and nylon 6,6/6T with triamine contents of less than or equal to about 0.5 weight percent (wt %), as well as others, such as the amorphous nylons may be useful for particular polyarylene ether-polyamide applications. Mixtures of various polyamides, as well as various polyamide copolymers, are also useful. The most preferred polyamide for the blends of the present invention is nylon-6,6. Polyamides having viscosity of up to about 400 milliliters per gram (ml/g) as measured in a 0.5 wt % solution in 96 wt % sulfuric acid in accordance with ISO 307.

The first polymer is generally used in amounts of about 5 to about 95 weight percent (wt %), based on the total weight of the electrically conductive composition. In one embodiment, the first polymer is generally used in amounts of about 15 to about 90 wt %, based on the total weight of the electrically conductive composition. In another embodiment, the first polymer is generally used in amounts of about 30 to about 80 wt %, based on the total weight of the electrically conductive composition. In yet another embodiment, the first polymer is generally used in amounts of about 35 to about 75 wt %, based on the total weight of the electrically conductive composition.

The second polymer is generally used in amounts of about 5 to about 95 weight percent (wt %), based on the total weight of the electrically conductive composition. In one embodiment, the second polymer is generally used in amounts of about 15 to about 90 wt %, based on the total weight of the electrically conductive composition. In another embodiment, the second polymer is generally used in amounts of about 30 to about 80 wt %, based on the total weight of the electrically conductive composition. In yet another embodiment, the second polymer is generally used in amounts of about 35 to about 75 wt %, based on the total weight of the electrically conductive composition.

The first and second polymers are generally used in amounts of 90 to 99.99 wt %, based on the weight of the electrically conductive composition. In one embodiment, the first and second polymer are generally used in amounts of 92 to 98 wt %, based on the weight of the electrically conductive composition. In another embodiment, the first and second polymers are generally used in amounts of 93 to 97 wt %, based on the weight of the electrically conductive composition. In another embodiment, the first and second polymers are generally used in amounts of 94 to 96 wt %, based on the weight of the electrically conductive composition.

Various additives may be added to the electrically conductive composition. Exemplary additives are compatibilizing agents, impact modifiers, mold release agents, antioxidants, antiozonants, thermal stabilizers, or the like, or a combination comprising at least one of the foregoing additives.

Electrically conductive fillers that can be added to the electrically conductive composition are carbon nanotubes, carbon fibers, carbon black, metallic fillers, non-conductive fillers coated with metallic coatings, electrically conductive non-metallic fillers, or the like, or a combination comprising at least one of the foregoing electrically conductive fillers.

Carbon nanotubes that can be used in the electrically conductive composition are single wall carbon nanotubes (SWNTs), multiwall carbon nanotubes (MWNTs), or vapor grown carbon fibers (VGCF). Single wall carbon nanotubes (SWNTs) used in the composition may be produced by laser-evaporation of graphite, carbon arc synthesis or a high-pressure carbon monoxide conversion process (HIPCO) process. These SWNTs generally have a single wall comprising a graphene sheet with outer diameters of about 0.7 to about 2.4 nanometers (nm). The SWNTs may comprise a mixture of metallic SWNTs and semi-conducting SWNTs. Metallic SWNTs are those that display electrical characteristics similar to metals, while the semi-conducting SWNTs are those that are electrically semi-conducting. In order to minimize the quantity of SWNTs utilized in the composition, it is generally desirable to have the composition comprise as large a fraction of metallic SWNTs as possible. SWNTs having aspect ratios of greater than or equal to about 5 are generally utilized in the compositions. While the SWNTs are generally closed structures having hemispherical caps at each end of the respective tubes, it is envisioned that SWNTs having a single open end or both open ends may also be used. The SWNTs generally comprise a central portion, which is hollow, but may be filled with amorphous carbon.

MWNTs derived from processes such as laser ablation and carbon arc synthesis, may also be used in the electrically conductive compositions. MWNTs have at least two graphene layers bound around an inner hollow core. Hemispherical caps generally close both ends of the MWNTs, but it may desirable to use MWNTs having only one hemispherical cap or MWNTs, which are devoid of both caps. MWNTs generally have diameters of about 2 to about 50 nm. When MWNTs are used, it is desirable to have an average aspect ratio greater than or equal to about 5. In one embodiment, the aspect ratio of the MWNTs is greater than or equal to about 100, while in another embodiment, the aspect ratio of the MWNTs is greater than or equal to about 1000.

Vapor grown carbon fibers (VGCF) may also be used in the electrically conductive composition. These are generally manufactured in a chemical vapor deposition process. VGCF having "tree-ring" or "fishbone" structures may be grown from hydrocarbons in the vapor phase, in the presence of particulate metal catalysts at moderate temperatures, i.e., about 800 to about 1500° C. In the "tree-ring" structure a multiplicity of substantially graphitic sheets are coaxially arranged about the core. In the "fishbone" structure the fibers are characterized by graphite layers extending from the axis of the hollow core.

VGCF having diameters of about 3.5 to about 2000 nanometers (nm) and aspect ratios greater than or equal to about 5 may be used. When VGCF are used, diameters of about 3.5 to about 500 nm are desirable, with diameters of about 3.5 to about 100 nm being more desirable, and diameters of about 3.5 to about 50 nm being most desirable. It is also desirable for the VGCF to have average aspect ratios greater than or equal to about 100. In one embodiment, the VGCF can have aspect ratios greater than or equal to about 1000.

Carbon nanotubes are generally used in amounts of about 0.001 to about 80 wt % of the total weight of the electrically conductive composition. In one embodiment, carbon nanotubes are generally used in amounts of about 0.25 wt % to about 30 wt %, based on the weight of the electrically conductive composition. In another embodiment, carbon nanotubes are generally used in amounts of about 0.5 wt % to about 10 wt %, based on the weight of the electrically conductive composition. In yet another embodiment, carbon nanotubes are generally used in amounts of about 1 wt % to about 5 wt %, based on the weight of the electrically conductive composition.

Various types of electrically conductive carbon fibers may also be used in the electrically conductive composition. Carbon fibers are generally classified according to their diameter, morphology, and degree of graphitization (morphology and degree of graphitization being interrelated). These characteristics are presently determined by the method used to synthesize the carbon fiber. For example, carbon fibers having diameters down to about 5 micrometers, and graphene ribbons parallel to the fiber axis (in radial, planar, or circumferential arrangements) are produced commercially by pyrolysis of organic precursors in fibrous form, including phenolics, polyacrylonitrile (PAN), or pitch.

The carbon fibers generally have a diameter of greater than or equal to about 1,000 nanometers (1 micrometer) to about 30 micrometers. In one embodiment, the fibers can have a diameter of about 2 to about 10 micrometers. In another embodiment, the fibers can have a diameter of about 3 to about 8 micrometers.

Carbon fibers are used in amounts of about 0.001 to about 50 wt % of the total weight of the electrically conductive composition. In one embodiment, carbon fibers are used in amounts of about 0.25 wt % to about 30 wt %, based on the weight of the electrically conductive composition. In another embodiment, carbon fibers are used in amounts of about 0.5 wt % to about 20 wt %, based on the weight of the electrically conductive composition. In yet another embodiment, carbon fibers are used in amounts of about 1 wt % to about 10 wt %, based on the weight of the electrically conductive composition.

Carbon black may also be used in the electrically conductive composition. Exemplary carbon blacks are those having average particle sizes less than about 200 nm. In one embodiment, carbon blacks having particle sizes of less than about 100 m can be used. In another embodiment, carbon blacks having particle sizes of less than about 50 nm can be used. Exemplary carbon blacks may also have surface areas greater than about 200 square meter per gram ($m^2/g$). In one embodiment, the carbon blacks can have surface areas of greater than about 400 $m^2/g$. In another embodiment, the carbon blacks can have surface areas of greater than about 1000 $m^2/g$. Exemplary carbon blacks may have a pore volume (dibutyl phthalate absorption) greater than about 40 cubic centimeters per hundred grams ($cm^3/100$ g). In one embodiment, the carbon blacks can have surface areas of greater than about 100 $cm^3/100$ g. In another embodiment, the carbon blacks can have surface areas of greater than about 150 $cm^3/100$ g. In one embodiment, it is desirable for the carbon black to have a low ionic content (chlorides, sulfates, phosphates, fluorides, and nitrates) of less than or equal to about 4 parts per million per gram (ppm/g). Exemplary carbon powders include the carbon black commercially available from Columbian Chemicals under the trade name CONDUCTEX®; the acetylene black available from Chevron Chemical, under the trade names S.C.F.® (Super Conductive Furnace) and E.C.F.® (Electric Conductive Furnace); the carbon blacks available from Cabot Corp. under the trade names VULCAN XC72® and BLACK PEARLS®; and the carbon blacks commercially available from Akzo Co. Ltd under the trade names KETJEN BLACK EC 300® AND EC 600®.

Carbon black is used in amounts of about 0.01 to about 50 wt % of the total weight of the electrically conductive composition. In one embodiment, carbon black is used in amounts of about 0.25 wt % to about 30 wt %, based on the weight of the electrically conductive composition. In another embodiment, carbon black is used in amounts of about 0.5 wt % to about 20 wt %, based on the weight of the electrically conductive composition. In yet another embodiment, carbon black is used in amounts of about 1 wt % to about 10 wt %, based on the weight of the electrically conductive composition.

Solid conductive metallic fillers may also be used in the electrically conductive compositions. These may be electrically conductive metals or alloys that do not melt under conditions used in incorporating them into the thermoplastic polymers, and fabricating finished articles therefrom. Metals such as aluminum, copper, magnesium, chromium, tin, nickel, silver, iron, titanium, or the like, or a combination comprising at least one of the foregoing metals can be incorporated. Physical mixtures and true alloys such as stainless steels, bronzes, or the like, can also serve as conductive fillers. In addition, a few intermetallic chemical compounds such as borides, carbides, or the like, of these metals, (e.g., titanium diboride) can also serve as conductive filler particles. Solid non-metallic, conductive filler particles such as tin-oxide, indium tin oxide, antimony oxide, or the like, or a combination comprising at least one of the foregoing fillers may also be added to render the thermoplastic resins conductive. The solid metallic and non-metallic conductive fillers may exist in the form of powder, drawn wires, strands, fibers, tubes, nanotubes, flakes, laminates, platelets, ellipsoids, discs, and other commercially available geometries.

Regardless of the exact size, shape and composition of the solid metallic and non-metallic conductive filler particles, they may be dispersed into the electrically conductive composition of loadings of 0.01 to about 50 wt %, based on the weight of the electrically conductive composition. In one embodiment, the solid metallic and non-metallic conductive filler particles may be used in amounts of about 0.25 wt % to about 30 wt %, based on the weight of the electrically conductive composition. In another embodiment, the solid metallic and non-metallic conductive filler particles may be used in amounts of about 0.5 wt % to about 20 wt %, based on the weight of the electrically conductive composition. In yet another embodiment, the solid metallic and non-metallic conductive filler particles may be used in amounts of about 1 wt % to about 10 wt %, based on the weight of the electrically conductive composition.

Non-conductive, non-metallic fillers that have been coated over a substantial portion of their surface with a coherent layer of solid conductive metal may also be used in the electrically conductive compositions. The non-conductive, non-metallic fillers are commonly referred to as substrates, and substrates coated with a layer of solid conductive metal may be referred to as "metal coated fillers". Typical conducting metals such as aluminum, copper, magnesium, chromium, tin, nickel, silver, iron, titanium, and mixtures comprising any one of the foregoing metals may be used to coat the substrates. Examples of such substrates include silica powder, such as fused silica and crystalline silica, boron-nitride powder, boron-silicate powders, alumina, magnesium oxide (or magnesia), wollastonite, including surface-treated wollastonite, calcium sulfate (as its anhydride, dihydrate or trihydrate), calcium carbonate, including chalk, limestone, marble and synthetic, precipitated calcium carbonates, generally in the form of a ground particulates, talc, including fibrous, modular, needle shaped, and lamellar talc, glass spheres, both hollow and solid, kaolin, including hard, soft, calcined kaolin, and kaolin comprising various coatings to facilitate compatibility with the polymeric matrix resin, mica, feldspar, silicate spheres, flue dust, cenospheres, fillite, aluminosilicate (armospheres), natural silica sand, quartz, quartzite, perlite, tripoli, diatomaceous earth, synthetic silica, and mixtures comprising any one of the foregoing. All of the above substrates may be coated with a layer of metallic material for use in the electrically conductive compositions.

Other commonly used non-conductive mineral fillers such as silicon carbide, molybdenum sulfide, zinc sulfide, aluminum silicate (mullite), synthetic calcium silicate, zirconium silicate, barium titanate, barium ferrite, barium sulfate, and flaked fillers such as glass flakes, flaked silicon carbide, aluminum diboride, may also be used as substrates for conductive metallic coatings. Fibrous fillers such as aluminum silicates, aluminum oxides, magnesium oxides, and calcium sulfate hemihydrate may also be coated with conductive metallic coatings and used in the electrically conductive compositions. Other fibrous fillers which may be used as substrates for conductive metallic coatings include natural fillers and reinforcements, such as wood flour obtained by pulverizing wood, and fibrous products such as cellulose, cotton, sisal, jute, starch, cork flour, lignin, ground nut shells, corn, rice grain husks, or the like. Also included among fibrous fillers that can be used as substrates for conductive metallic coatings are single crystal fibers or "whiskers" including silicon carbide, alumina, boron carbide, and mixtures comprising any one of the foregoing. Glass fibers, including textile glass fibers such as E, A, C, ECR, R, S, D, and NE glasses and quartz, or the like, or a combination comprising at least one of the foregoing glass fibers may also be coated with a conductive metallic coating and used in the electrically conductive composition.

Organic reinforcing fibrous fillers which can be used as substrates for conductive metallic coatings include fibers obtained from organic polymers such as poly(ether ketone), polyetherimide, polybenzoxazole, poly(phenylene sulfide), polyesters, polyethylene, aromatic polyamides, aromatic polyetherimides or polyetherimides, polytetrafluoroethylene, acrylic resins, poly(vinyl alcohol), and other polymers. Such reinforcing fillers may be provided in the form of monofilament or multifilament fibers and can be used either alone or in combination with other types of fiber, through, for example, co-weaving or core/sheath, side-by-side, orange-type or matrix and fibril constructions, or by other methods known to one skilled in the art of fiber manufacture. Typical cowoven structures that can be used as substrates include glass fiber-carbon fiber, carbon fiber-aromatic polyetherimide (aramid) fiber, and aromatic polyetherimide fiberglass fiber. Fibrous fillers to be used as substrates for conductive metallic coatings may be supplied in the form of, for example, rovings, woven fibrous reinforcements, such as 0-90 degree fabrics, non-woven fibrous reinforcements such as continuous strand mat, chopped strand mat, tissues, papers and felts and 3-dimensional woven reinforcements, preforms, braids, and mixtures comprising any one of the foregoing.

Regardless of the exact size, shape and composition of said substrates, they are coated with a solid layer of conductive metal covering from about 5% of the surface area to 100% of the surface area. The surface area is typically determined by commonly known methods such as BET nitrogen adsorption or mercury porosimetry. In one embodiment, the metal coated fillers may be used in amounts of about 0.25 wt % to about 50 wt %, based on the weight of the electrically conductive composition. In another embodiment, the metal coated fillers may be used in amounts of about 0.5 wt % to about 30 wt %, based on the weight of the electrically conductive composition. In yet another embodiment, the metal coated fillers may be used in amounts of about 1 wt % to about 20 wt %, based on the weight of the electrically conductive composition.

In one embodiment carbon fibers, VGCF, carbon nanotubes, carbon black, conductive metal fillers, conductive non-metal fillers, metal coated fillers as detailed above, or any combination of the foregoing may be used in the electrically conductive composition to render the electrically conductive composition electrostatically dissipative. An exemplary electrically conductive filler is carbon nanotubes. It is generally desirable to use the conductive fillers in amounts effective to produce surface resistivity less than or equal to about $10^9$ ohm/square as measured as per ASTM D 257. In another embodiment, it is desirable of have the surface resistivity of the electrically conductive composition be less than or equal to about $10^7$ ohm/square. In yet another embodiment, it is desirable of have the surface resistivity of the electrically conductive composition be less than or equal to about $10^5$ ohm/square.

It is also desirable to have the specific volume resistivity (SVR) of the electrically conductive composition less than or equal to about $10^{12}$ ohm-centimeter. In one embodiment, it is desirable to have the volume resistivity less than or equal to about $10^6$ ohm-centimeter. In another embodiment, it is desirable to have the volume resistivity less than or equal to about $10^3$ ohm-centimeter. In yet another embodiment, it is desirable to have the volume resistivity less than or equal to about 100 ohm-centimeter. In conjunction with the volume resistivity of less than or equal to about $10^{12}$ ohm-centimeter, it is desirable for the electrically conductive composition to have a notched Izod impact strength of greater than or equal to about 10 kilojoules/square meter and a Class A surface finish. In one embodiment, it is desirable to have a notched Izod impact strength of greater than or equal to about 15 kilojoules/square meter. In another embodiment, it is desirable to have a notched Izod impact strength of greater than or equal to about 20 kilojoules/square meter.

The specific volume resistivity is measured on a fractured dog bone sample having an injection-molded length of 30 centimeters prior to the fracturing. The sample is fractured under liquid nitrogen. Prior to fracturing, stress fracture lines are generated at a distance of 10 centimeters apart on the surface of the sample. The sample is then fractured under liquid nitrogen. After fracturing the sample, it is subjected to drying to remove any condensed moisture from the fractured surfaces. The fractured surfaces are then painted with a conductive silver paint. The silver paint is then dried prior to making the measurements. Resistance measurements or voltage measurements are made by using a voltammeter. The electrodes of the voltammeter are applied to the fracture surfaces to determine the resistance of the sample, following which the resistivity is calculated.

As noted above, the masterbatch can also contain non-electrically conducting fillers and additives. Examples of suitable non-conducting electrically conductive fillers are anti-oxidants, anti-ozonants, dyes, colorants, infrared light absorbers, ultraviolet light absorbers, reinforcing fillers, compatibilizers, plasticizers, fibers, or the like, or a combination comprising at least one of the foregoing non-conductive fillers.

An exemplary process for manufacturing the electrically conductive composition generally comprises melt blending. Melt blending of the electrically conductive composition involves the use of shear force, extensional force, compressive force, ultrasonic energy, electromagnetic energy, thermal energy or combinations comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or combinations comprising at least one of the foregoing.

Melt blending involving the aforementioned forces may be conducted in machines such as, single or multiple screw extruders, Buss kneader, Eirich mixers, Henschel, helicones, Ross mixer, Banbury, roll mills, molding machines such as injection molding machines, vacuum forming machines, blow molding machines, or the like, or combinations comprising at least one of the foregoing machines. It is generally desirable during melt or solution blending of the composition to impart a specific energy of about 0.01 to about 10 kilowatt-hour/kilogram (kwhr/kg) of the composition.

In one embodiment, in one method of manufacturing the electrically conductive composition, it is desirable to melt a masterbatch comprising up to about 50 wt % of the electrically conductive filler in a first extruder. The molten masterbatch is diluted with the first polymer in the first extruder and is fed into a second extruder containing the molten second polymer. Blending of the two melts occurs in the second extruder. The electrically conductive composition comprising the electrically conductive filler is extruded from the second extruder and then pelletized.

In this arrangement, the first extruder serves as a side compounder to the second extruder, which is the main extruder. In one embodiment, the first and the second extruders are twin screw extruders. In another embodiment, the first extruder can be a single screw extruder while the second extruder can be a twin screw extruder. The pelletized extrudate can then be subjected to optional drying prior to injection molding.

In an exemplary embodiment, the masterbatch comprises nylon-6,6 and multiwall carbon nanotubes in an amount of about 20 wt %, based upon the total weight of the masterbatch. The masterbatch is melted in the first extruder and its melt viscosity is reduced by diluting the masterbatch with additional nylon 6,6. The reduced viscosity molten masterbatch is then fed from the first extruder into the second extruder. The second extruder generally contains a compatibilized composition comprising polyphenylene ether and nylon-6,6. The compatibilized composition is the second polymer. It is desirable for the melt viscosity of the diluted masterbatch to be approximately equal to the melt viscosity of the second polymer at the point of contact of the two melts in the second extruder. In one embodiment, the melt viscosity of the reduced viscosity molten masterbatch lies within about 10% of the melt viscosity of the second polymer at the point of contact of the two melts. In another embodiment, the melt viscosity of the reduced viscosity molten masterbatch lies within about 20% of the melt viscosity of the second polymer at the point of contact of the two melts.

The masterbatch can be diluted with the first polymer from about 10 wt % to about 1000 wt %, based upon the weight of the masterbatch. In one embodiment, the masterbatch can be diluted with the first polymer from about 100 wt % to about 800 wt %, based upon the weight of the masterbatch. In another embodiment, the masterbatch can be diluted with the first polymer from about 200 wt % to about 600 wt %, based upon the weight of the masterbatch. In yet another embodiment, the masterbatch can be diluted with the first polymer from about 300 wt % to about 500 wt %, based upon the weight of the masterbatch.

This method of manufacturing the electrically conductive composition is advantageous in that the composition displays a uniform specific volume resistivity in any two mutually perpendicular directions as compared with samples manufactured by other methods. In other words, there is a reduction in the anisotropy in the electrical properties of the electrically conductive composition when compared with compositions manufactured by other methods. In reducing the anisotropy, it is preferable to have the ratio of volume resistivity (resistivity ratio) in the direction parallel to the flow direction to that in the direction perpendicular to the flow direction to be greater than or equal to about 0.25. In one embodiment, it is desirable for the resistivity ratio to be greater than or equal to about 0.4. In another embodiment, it is desirable for the resistivity ratio to be greater than or equal to about 0.5. In yet another embodiment, it is desirable for the resistivity ratio to be equal to 1. A sample having a resistivity ratio of 1 is believed to have no anisotropy. The flow direction as defined herein is the direction of flow of the composition during the processing process.

The electrically conductive composition can be advantageously used in automobiles, in particular, as exterior body panels. Other useful applications are in chip trays, computers, electronic goods, semi-conductor components, circuit boards, or the like which need to be protected from electrostatic dissipation.

The following examples, which are meant to be exemplary, not limiting, illustrate compositions and methods of manufacturing of some of the various embodiments of the electrically conductive compositions described herein.

EXAMPLES

This example demonstrates the effect of reducing the melt viscosity of the masterbatch on the specific volume resistivity and the notched Izod impact properties of the electrically conductive composition. In this example comparative samples were tested against the samples that demonstrate the improved method for production of the electrically conductive compositions. The electrically conductive composition comprised a compatibilized blend of polyphenylene ether and nylon 6,6. The polyphenylene ether was obtained from General Electric Advanced Materials. The masterbatch comprises nylon 6,6 and multiwall carbon nanotubes. The multiwall carbon nanotubes were present in the masterbatch in and amount of 20 wt %, based on the weight of the masterbatch. The masterbatch was purchased from Hyperion Catalyts Inc. Citric acid was used to compatibilize the polyamide with the polyphenylene ether. A mixture of copper iodide and potassium iodide along with IRGANOX 1076® was used as the antioxidant. The impact modifier used was KRATON G 1701X®, a styrene ethylene propylene copolymer and KRATON G1651®, a styrene ethylene-butadiene styrene triblock copolymer. Both impact modifiers are commercially available from Kraton Polymers. The composition is shown in Table 1.

TABLE 1

| Composition | Weight percents (wt %) |
|---|---|
| Polyphenylene ether | 39.4 |
| Polyamide (Nylon 6,6) | 46.4 |
| Citric acid | 0.65 |
| IRGANOX 1076 ® | 0.3 |
| KRATON G 1701X ® | 3.5 |
| KRATON G1651 ® | 7 |
| Carbon nanotube Masterbatch | 3 |
| Copper Iodide | 0.01 |
| Potassium Iodide | 0.05 |

Figure 2:
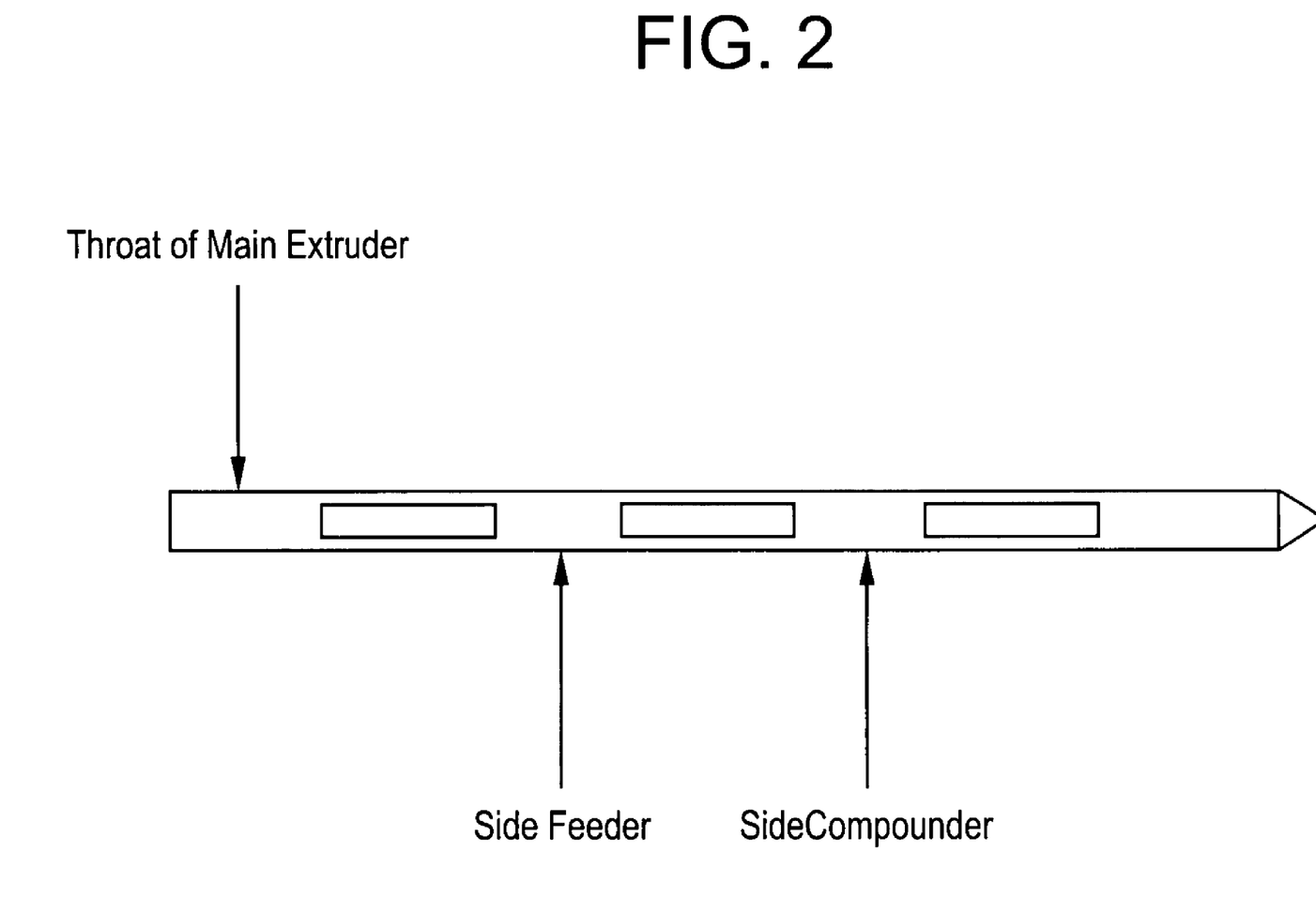
FIG. 2 depicts the extruder with the side feeder and the side compounder that was used for the preparation of Sample #'s 1 through 20.

FIG. 2 represents the extruder set up for the experiments. The main extruder (second extruder) was a 28 mm Werner and Pfleiderer twin screw extruder. The extruder had 11 barrels set at temperatures of 50° C., 280° C., 300° C., 300° C., 300° C., 300° C., 290° C., 300° C., 300° C., 300° C., 300° C. and 300° respectively. The die was set at a temperature of 310° C. The screw speed was 300 revolutions per minute. The extruder had a side feeder located at barrel 6 and a side compounder (first extruder) located at barrel 9. As shown in the Table 2, the comparative sample was prepared by feeding the polyphenylene ether along with the compatibilizers and other additives into the throat of the second extruder, while the nylon 6,6 and the masterbatch were fed into the second extruder via the side feeder (SF). The side feeder feeds the nylon 6,6 and the masterbatch into the second extruder at room temperature.

TABLE 2

|  | Throat of Second Extruder | Side Feeder (SF) | First Extruder |
|---|---|---|---|
| Comparative Samples | Polyphenylene ether + additives | Nylon 6,6 + masterbatch | — |
| Samples manufactured according to disclosure | Polyphenylene ether + additives | Nylon 6,6 | Nylon 6,6 + masterbatch |

From the Table 2, it may be seen that those samples prepared according to this disclosure had the masterbatch and a portion of the nylon 6,6 melt blended in the first extruder (side compounder (SC)) following which they were fed into the second extruder. The remaining portion of the nylon 6,6 was fed into the second extruder at room temperature via the side feeder.

The masterbatch was diluted with the nylon 6,6 in the first extruder in a weight ratio of masterbatch:nylon 6,6 of 1:2, 1:4, 1:5 and 1:6. Table 3 shows the comparative sample as well as the samples made according to this disclosure for electrically conductive compositions comprising 0.6 wt % of the multiwall carbon nanotubes.

TABLE 3

| Sample | Comp. Sample 1 | Sample 2 | Sample 3 | Sample 4 | Sample 5 |
|---|---|---|---|---|---|
| MWNT (wt %) | 0.6 | 0.6 | 0.6 | 0.6 | 0.6 |
| Masterbatch dilution | 0 | 1:2 | 1:4 | 1:5 | 1:6 |
| Masterbatch Feeding position | SF* | SC** | SC | SC | SC |
| Izod Notched Impact @ RT [kJ/m²] | 23 | 22 | 22.8 | 22.2 | 22.2 |
| SVR (kOhm-cm) | 114286 | 92480 | 92309 | 50434 | 51017 |

*SF = side feeder;
**SC = first extruder (side compounder)

Table 3 shows that the comparative sample 1 has a specific volume resistivity (SVR) of 114,286 kiloohm-centimeter. However, samples that are diluted with the nylon 6,6 in the first extruder (side compounder) and then introduced in the molten state into the second extruder (main extruder) have a reduced specific volume resistivity when compared with samples where the masterbatch is introduced into the side feeder at room temperature.

Tables 4, 5 and 6 below show similar beneficial effects of masterbatch dilution on the specific volume resistivity at MWNT loadings of 0.8 wt %, 1 wt % and 1.2 wt respectively.

TABLE 4

| Sample | Comp. Sample 6 | Sample 7 | Sample 8 | Sample 9 | Sample 10 |
|---|---|---|---|---|---|
| MWNT (wt %) | 0.8 | 0.8 | 0.8 | 0.8 | 0.8 |
| Masterbatch dilution | 0 | 1:2 | 1:4 | 1:5 | 1:6 |
| Masterbatch Feeding position | SF | SC | SC | SC | SC |
| Izod Notched Impact @ RT [kJ/m2] | 23.2 | 22.2 | 22.3 | 22 | 22.7 |
| SVR (kOhm-cm) | 464 | 36.5 | 29.0 | 18.7 | 17.2 |

TABLE 5

| Sample | Comp. Sample 11 | Sample 12 | Sample 13 | Sample 14 | Sample 15 |
|---|---|---|---|---|---|
| MWNT (wt %) | 1 | 1 | 1 | 1 | 1 |
| Masterbatch dilution | 0 | 1:2 | 1:4 | 1:5 | 1:6 |
| Masterbatch Feeding position | SF | SC | SC | SC | SC |
| Izod Notched Impact @ RT [kJ/m2] | 24.1 | 22.5 | 20.7 | 21.7 | 21.4 |
| SVR (kOhm-cm) | 11 | 2.2 | 2.6 | 1.7 | 2.0 |

TABLE 6

| Sample | Comp. Sample 16 | Sample 17 | Sample 18 | Sample 19 | Sample 20 |
|---|---|---|---|---|---|
| MWNT (wt %) | 1.2 | 1.2 | 1.2 | 1.2 | 1.2 |
| Masterbatch dilution | 0 | 1:2 | 1:4 | 1:5 | 1:6 |

TABLE 6-continued

| Sample | Comp. Sample 16 | Sample 17 | Sample 18 | Sample 19 | Sample 20 |
|---|---|---|---|---|---|
| Masterbatch Feeding position | SF | SC | SC | SC | SC |
| Izod Notched Impact @ RT [kJ/m2] | 23.1 | 22 | 19.2 | 20.8 | 18.9 |
| SVR (kOhm-cm) | 2.6 | 0.4 | 0.9 | 0.8 | 0.8 |

From the Tables 3, 4, 5 and 6 it may be seen that as the level of dilution in the first extruder increases, the volume resistivity of the sample decreases, indicating that the reduced viscosity brought about by the dilution of the masterbatch improves the dispersion. Without being limited by theory, it is believed that the reduction in viscosity plays an important role in the optimization of the dispersion, which permits a reduction in the resistivity of the compositions. Alternatively, by reducing the resistivity of the compositions, a lower amount of electrically conductively filler can be used thereby reducing material costs as well as reducing the amount of processing required and the energy expenditures accompanying this processing.

Articles made by the aforementioned method can be advantageously used in automobiles for parts such as automotive exterior body panels, fenders, dashboards, or the like.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of manufacturing an electrically conductive composition comprising:
   reducing the viscosity of a molten masterbatch to form a reduced viscosity molten masterbatch; and
   mixing the reduced viscosity molten masterbatch with a polymer to form the electrically conductive composition.

2. The method of claim 1, wherein the viscosity of the molten masterbatch is reduced by mixing it with a diluent, a plasticizer, a polymer having a melt viscosity that is lower than the viscosity of the molten masterbatch, or a combination thereof.

3. A method of manufacturing an electrically conductive composition comprising:
   mixing a molten masterbatch with a first polymer in a first extruder, wherein the first polymer has a melt viscosity that is lower than the melt viscosity of the molten masterbatch;
   reducing the melt viscosity of the molten masterbatch to form a reduced viscosity molten masterbatch; and
   mixing the reduced viscosity molten masterbatch with a second polymer in a second extruder to form the electrically conductive composition.

4. The method of claim 3, wherein the molten masterbatch comprises a polymer and an electrically conductive filler.

5. The method of claim 4, wherein the electrically conductive filler is carbon black, carbon nanotubes, carbon fibers, metallic fillers, non-conductive fillers coated with metallic coatings, electrically conductive non-metallic fillers, or a combination comprising at least one of the foregoing electrically conductive fillers.

6. The method of claim 5, wherein the carbon nanotubes are single wall carbon nanotubes, multiwall carbon nanotubes, vapor grown carbon fibers, or a combination comprising at least one of the foregoing carbon nanotubes.

7. The method of claim 4, wherein the molten masterbatch comprises up to about 50 wt % of the electrically conductive fillers, based on the weight of the molten masterbatch.

8. The method of claim 3, wherein the first extruder is a side compounder to the second extruder.

9. The method of claim 3, wherein the first polymer is the same as the second polymer.

10. The method of claim 3, wherein the first polymer is different from the second polymer.

11. The method of claim 3, wherein the first polymer and the second polymer are compatibilized in the electrically conductive composition.

12. The method of claim 3, wherein the first polymer and/or the second polymer is a thermoplastic, a thermoset, or a combination of a thermoplastic with a thermoset.

13. The method of claim 3, wherein the first polymer and/or the second polymer is a
   polyacetal, a polyacrylic, a polyarylene ether, a polycarbonate, a polystyrene, a polyester, a polyamide, a polyamideimide, a polyarylate, a polyurethane, a polyarylsulfone, a polyethersulfone, a polyarylene sulfide, a polyvinyl chloride, a polyetherimide, a polyimide, a polytetrafluoroethylene, a polyetherketone, a polyether ether ketone or a combination comprising at least one of the foregoing polymeric resins.

14. The method of claim 3, wherein the first polymer is a polyamide and wherein the second polymer is a polyarylene ether.

15. The method of claim 3, wherein the electrically conductive composition comprises a compatibilizer and an impact modifier.

16. The method of claim 3, wherein the electrically conductive composition has a specific volume resistivity of less than or equal to about $10e^8$ ohm-cm, a notched Izod impact strength of greater than 10 kilojoules/square meter and a Class A surface finish.

17. The method of claim 3, wherein the electrically conductive composition has a specific volume resistivity of less than or equal to about $10e^8$ ohm-cm and a notched Izod impact strength of greater than 15 kilojoules/square meter.

18. A method of manufacturing an electrically conductive composition comprising:
   mixing a molten masterbatch with a polyamide in a first extruder, wherein the polyamide has a melt viscosity that is lower than the melt viscosity of the molten masterbatch;
   reducing the melt viscosity of the molten masterbatch to form a reduced viscosity molten masterbatch; and
   mixing the reduced viscosity molten masterbatch with a polyarylene ether in a second extruder to form the electrically conductive composition.

19. The method of claim 18, wherein the molten masterbatch comprises a polyamide and carbon nanotubes.

20. The method of claim 18, wherein the polyarylene ether is compatibilized with a polyamide prior to the mixing with the reduced viscosity molten masterbatch.

21. The method of claim 18, further comprising molding the electrically conductive composition.

* * * * *